United States Patent [19]

Nelson

[11] Patent Number: 5,374,098
[45] Date of Patent: Dec. 20, 1994

[54] AERODYNAMIC STABILIZER FOR USE WITH A MOTOR VEHICLE

[75] Inventor: Gary Nelson, Concord, N.C.

[73] Assignee: National Association For Stock Car Auto Racing, Inc., Daytona Beach, Fla.

[21] Appl. No.: 182,411

[22] Filed: Jan. 14, 1994

[51] Int. Cl.⁵ .................................................. B62D 35/00
[52] U.S. Cl. ................................ 296/180.1; 296/180.5; 188/270; 180/903
[58] Field of Search ..................... 296/180.1, 180.5; 180/903; 188/270

[56] References Cited

U.S. PATENT DOCUMENTS

| | | | |
|---|---|---|---|
| 2,149,161 | 2/1939 | Byrnes | 188/270 |
| 2,979,165 | 4/1961 | McCambridge | 296/180.5 X |
| 3,596,974 | 8/1971 | Adams | 296/91 X |
| 4,160,494 | 7/1979 | McCambridge | 296/180.5 X |
| 4,170,377 | 10/1979 | Ingram | 296/191 X |
| 4,256,339 | 3/1981 | Ingram | |
| 4,674,788 | 6/1987 | Ohmura et al. | 296/91 X |
| 5,054,844 | 10/1991 | Miwa | 296/198 |
| 5,222,438 | 6/1993 | Ende | 188/270 X |

Primary Examiner—Dennis H. Pedder
Attorney, Agent, or Firm—Bell, Seltzer, Park & Gibson

[57] ABSTRACT

There is provided an aerodynamic stabilizer assembly adapted to be mounted in the rear portion of the roof of a motor vehicle. The assembly includes a framework having a front edge and partitioned to define separate openings. A pair of elongated air deflection panels each sized to cover one of the framework openings and each air deflection panel being pivotedly mounted to the framework along a longitudinal axis at the front edge of the assembly framework and being pivotable between a lowered passive position and a raised active position. There are springs arranged on each longitudinal axis for biasing each air deflection panel in the passive position. The assembly framework also includes cables means for limiting the upward rotational movement of the rear edge of each of the panels beyond the raised active position. When a motor vehicle is moving at a high rate of speed and is spinning out the low pressure of the air moving across the roof creates a pressure differential which acts on the panels and causes the panels to rotate to the active raised position thereby resulting in a downward force urging the motor vehicle against the road.

6 Claims, 2 Drawing Sheets

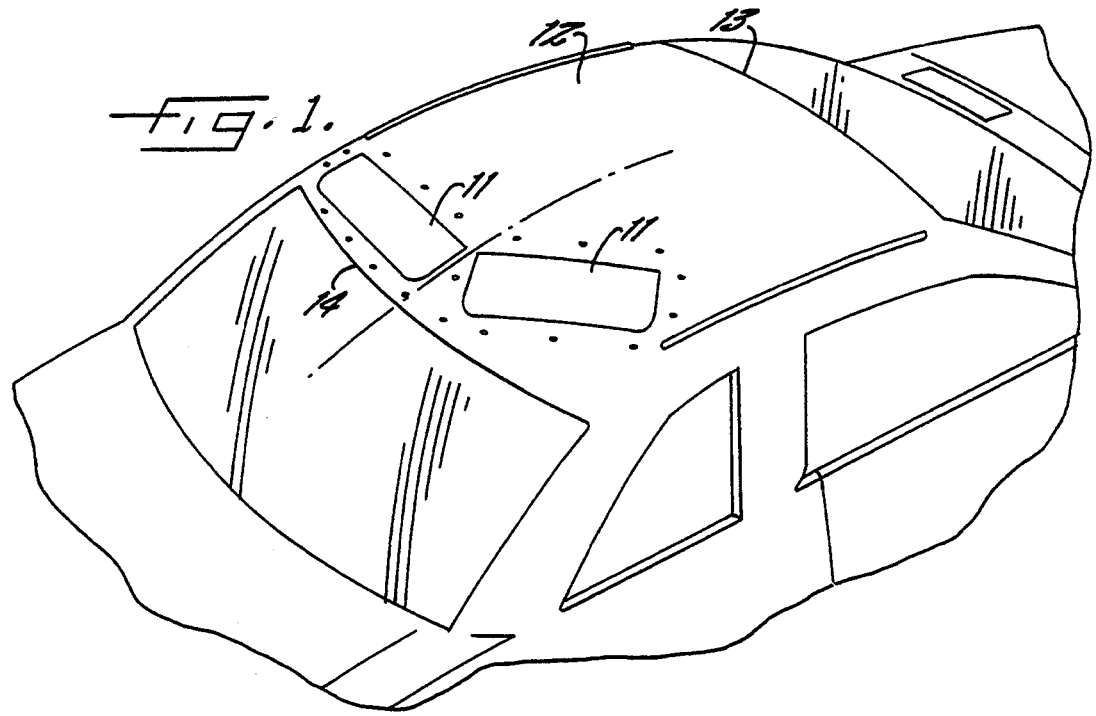
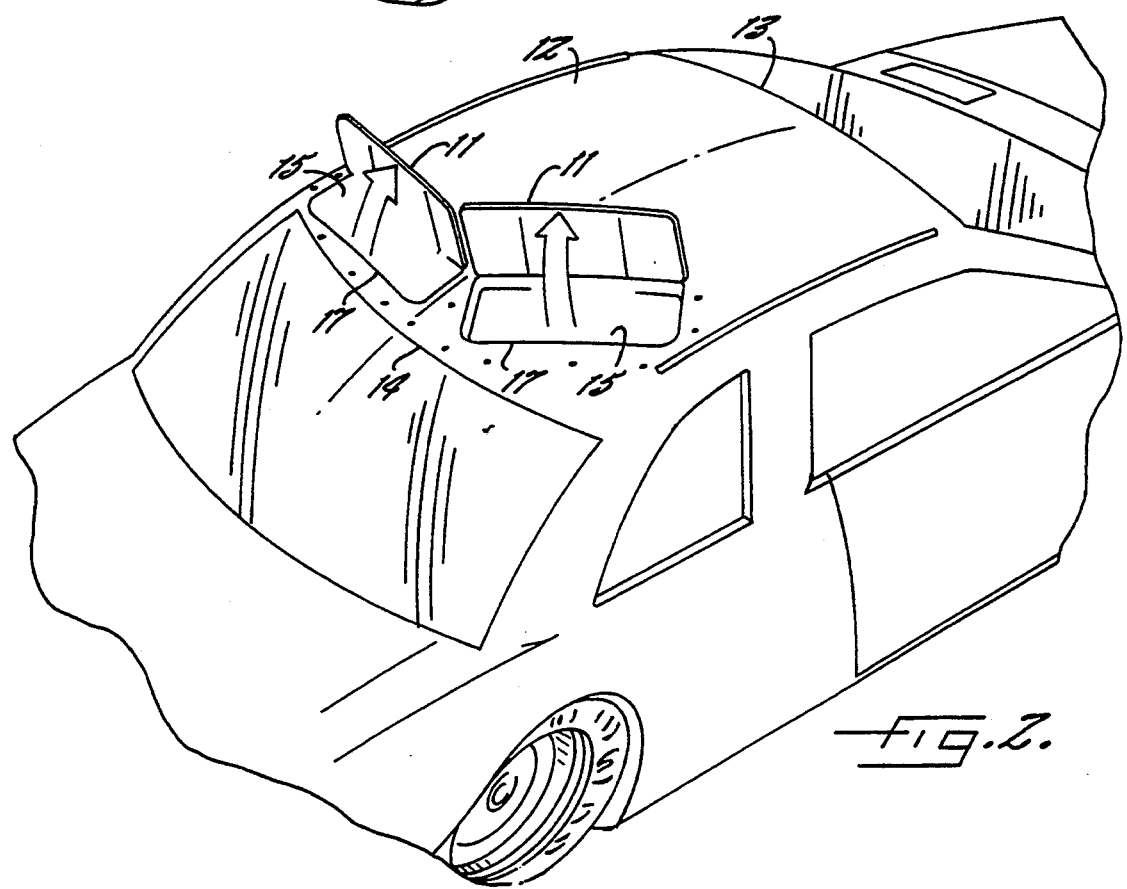

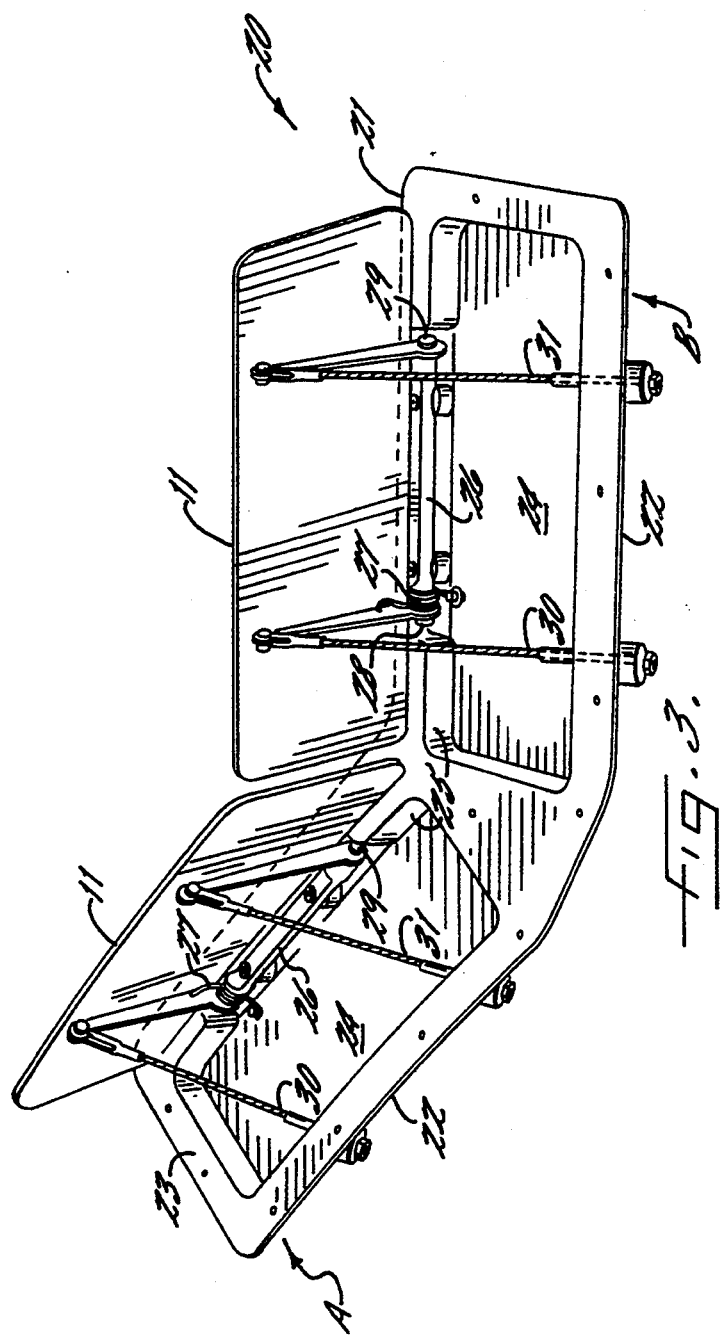
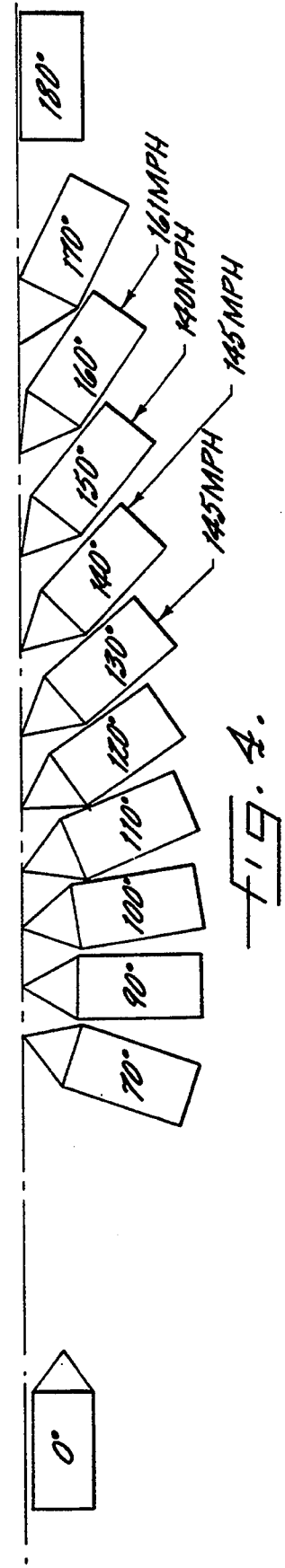

AERODYNAMIC STABILIZER FOR USE WITH A MOTOR VEHICLE

FIELD OF THE INVENTION

The present invention relates to an aerodynamic stabilizer safety device for use with a motor vehicle, especially race cars. More particularly, this invention relates to an apparatus for aiding motor vehicles in remaining on the road surface at high speeds.

BACKGROUND OF THE INVENTION

When race cars are properly aligned on a race track their tires tend to remain on the track even at high speeds when the cars use wind deflection devices such as rear deck spoilers and the like. However, occasionally race cars spin out at high speeds, i.e., they rotate. At the high speeds, say 140 miles per hour and higher, the aerodynamic forces at certain angles during the spin cause the vehicle to lift off of the track leaving the driver with no way of controlling the car. As the car spins the air passing over the hood, roof and rear deck lower the air pressure sufficiently to cause the lifting of the car Numerous devices have been developed in attempts to overcome this problem but they have met with little or only partial success.

It is an object of the present invention to provide an aerodynamic stabilizer device for increasing the safety of motor vehicles, especially race cars, at high speeds.

Another object of this invention is to provide a device for deflecting the movement of air across the roof of a moving vehicle.

SUMMARY OF THE INVENTION

In accordance with the present invention, these and other objects, features and advantages are achieved by the embodiments illustrated herein by the provision of a aerodynamic stabilizer adapted to be mounted in the roof panel of a motor vehicle. When a motor vehicle is moving at a high rate of speed and is spinning out the air pressure differential flowing across the roof causes a pair of elongated air deflection panels on the aerodynamic stabilizer to automatically rotate to a raised position to act as an air dam and urge the vehicle against the road. The aerodynamic stabilizer assembly is preferably affixed to an opening located in the rear portion of the roof of a motor vehicle. Each opening may be disposed at an angle to one another. It was surprisingly found that the area of lowest air pressure across the top of a moving vehicle spinning out at a high rate of speed is at the rear of the roof panel.

The aerodynamic stabilizer assembly includes a framework having a front edge and partitioned to define two separate openings. A pair of elongated air deflection panels each sized to cover a respective framework openings and each air deflection panel being pivotedly mounted to the framework along a longitudinal axis at the front edge of the assembly framework and being pivotable between a lowered passive position and a raised active position. The elongated air deflection panels preferably fit in such a relationship with the roof panel opening that no increased drag occurs across the roof when the deflection panels are in a lowered passive position. There are springs arranged on each longitudinal axis for biasing each air deflection panel toward the lowered passive position. The assembly frame also includes means for limiting the upward rotational movement of the rear edge of each of the elongated air deflection panels beyond the raised active position.

In another embodiment, one of the elongated air deflection panels is disposed in said roof opening substantially perpendicular to a center line from the front to the rear of the roof.

When a motor vehicle is moving at a high rate of speed and is spinning out the low pressure of the air moving across the roof creates a pressure differential which acts on the panels and causes the panels to rotate from the lowered passive position to the raised active position thereby resulting in a downward force acting on the panels and thus on the motor vehicle roof by reason of the air moving across the roof and urging the motor vehicle against the road.

BRIEF DESCRIPTION OF THE DRAWINGS

Other objects, features and advantages of the invention will be apparent from the detailed description of the invention when taken in conjunction with the accompanying drawings, in which:

FIG. 1 is a perspective view of a motor vehicle roof viewed from the rear of the vehicle illustrating the air deflection panels of the aerodynamic stabilizer assembly of the present invention in passive position;

FIG. 2 is a perspective view of a motor vehicle roof viewed from the rear of the vehicle illustrating the air deflection panels of the aerodynamic stabilizer of the present invention in active position;

FIG. 3 is a perspective view of the aerodynamic stabilizer framework assembly of the present invention; and FIG. 4 is a diagram showing the yaw angle and the speed at which a moving automobile lifts off of the track.

DESCRIPTION OF THE PREFERRED EMBODIMENTS

Referring now more specifically to the drawings, FIG. 1 shows a motor vehicle having a roof 12, a front 13 and a rear 14. The perspective view shows the air deflection panels 11 of the aerodynamic stabilizer assembly placed in openings 15, 15' at the rear of the roof 12 in a retracted or passive position. The panels 11 of the aerodynamic stabilizer assembly are rotatably movable between a passive position shown in FIG. 1 and an active position shown in FIG. 2.

As shown more clearly in FIG. 2, the aerodynamic stabilizer assembly is located in open framework in the rear portion of the roof of an automobile partitioned into two portions with each portion disposed at angle to one another. It was surprisingly found that the area of lowest air pressure across the top of a moving vehicle is at the rear of the roof panel. A pair of roof openings 15, 15', each have a front edge and are located in the rear portion of the vehicle roof 12. Each opening is preferably disposed at an angle to one another.

Turning now to FIG. 3, there is shown an assembly frame 20 having a front edge 21 and a rear edge 22. The assembly frame is partitioned into two portions A and B, with each portion disposed at an angle to one another. The portions A and B of the assembly frame are disposed at an angle of from 5 to 60 degrees from each other. The assembly frame 20 has a flange 23 extending around the periphery which may be used to affix the assembly frame to the roof beneath each of said roof openings. The assembly frame 20 may be affixed using rivets Or the like. Each of portions A and B may form a well having a bottom 24 and sides 25. The depth of each well may vary but in general is from about 1 inch to 2 inches deep, sufficient to accommodate the workings of the assembly.

A pair of elongated air deflection panels 11 is provided. Each panel may be generally rectangular but is sized to cover one of the framework openings. Each air deflection panel is pivotably mounted 28, 29 to the framework along a longitudinal axis 26 at the front edge of the assembly framework 20. In a preferred embodiment the elongated air deflection panels fit flush with the upper surface of the roof. In another embodiment one of the elongated air deflection panels is disposed in said roof perpendicular to a center line from the front to the rear of the roof. The elongated air deflection panels are disposed at an angle of from 5 to 60 degrees from each other.

The elongated air deflection panels are biased on each longitudinal axis toward the passive position. The biasing means are preferably springs 27. Means are provided for limiting the upward movement of each of said air deflection panels. A preferred means for limiting the upward movement of each of said elongated air deflection panels are cable supports 30, 31 to limit the upward rotational movement of the rear edge of the panel beyond the raised active position. The cables have one end attached toward a rear edge of the elongated air deflection panel and the other end attached to the rear portion of the assembly framework.

Turning now to FIG. 4 there is shown the relationship between the yaw angle and the speed of the race car at which the car leaves the race track. It is this angle and speed at which air pressure differential is sufficiently low to cause the air deflection panels to rotate from the lowered passive position to the raised active position. Once the air pressure equalizes the air deflection panels automatically return to the lowered passive position due to the biasing means.

In operation, the aerodynamic stabilizer begins to function when the motor vehicle is moving at a high rate of speed and is spinning out. The panels activate when the low pressure of the air moving across the roof creates a pressure differential which acts on the panels and causes the panels to rotate from the lowered passive position to the active raised position thereby resulting in a downward force acting on the panels and thus, on the motor vehicle roof by reason of the air moving across the roof and urging the motor vehicle against the road.

The invention has been described in detail with particular reference to preferred embodiments and the operation thereof, but it is understood that variations, modifications, and the substitution of equivalent means can be effected within the spirit of this invention.

What is claimed is:

1. An aerodynamic stabilizer assembly adapted to be mounted in the roof of a motor vehicle comprising:

all assembly framework having a front edge and partitioned so as to define two separate openings;

a pair of elongated air deflection panels, each having a front edge and a rear edge, and each panel being sized to cover one of said framework openings and each air deflection panel being pivotedly mounted along a longitudinal axis at the front edge of said assembly framework so as to be pivotable between a lowered passive position covering the respective framework opening and a raised active position;

means arranged on each longitudinal axis for biasing each air deflection panel toward said passive position; and means for limiting the upward rotational movement of the rear edge of each of said elongated air deflection panels beyond said raised active position, whereby when said motor vehicle is moving at a high rate of speed and is spinning out the low pressure of the air moving across the roof creates a pressure differential which acts on the panels and causes the panels to rotate from said passive position to said active position thereby resulting in a downward force acting on the panels and thus on the motor vehicle roof by reason of the air moving across the roof and urging the motor vehicle against the road.

2. The aerodynamic stabilizer assembly according to claim 1 wherein said assembly is mounted in the rear portion of the roof of said motor vehicle.

3. The aerodynamic stabilizer assembly according to claim 1 wherein said pair of elongated air deflection panels fit flush with the upper surface of the roof.

4. The aerodynamic stabilizer assembly according to claim 1 wherein said means for limiting the upward rotational movement of the rear edge of each of said elongated air deflection panels are cables having one end attached toward a rear edge of said elongated air deflection panel and the other end attached to the rear portion of the assembly framework.

5. The aerodynamic stabilizer assembly according to claim 1 wherein said elongated air deflection panels are disposed at an angle of from 5 to 60 degrees from each other.

6. The aerodynamic stabilizer assembly according to claim 1 wherein one of the elongated air deflection panels is disposed in the motor vehicle roof perpendicular to a center line from the front to the rear of the roof.

* * * * *